United States Patent [19]

Wong et al.

[11] Patent Number: 5,671,825
[45] Date of Patent: Sep. 30, 1997

[54] SHIELDED BEARING LUBRICATION

[75] Inventors: Jeffrey A. Wong, Stevensville; Thomas L. Daugherty, Arnold; Gordon D. Huntzberry, Glen Burnie, all of Md.

[73] Assignee: The United States of America as represented by the Secretary of the Navy, Washington, D.C.

[21] Appl. No.: 753,055

[22] Filed: Nov. 19, 1996

[51] Int. Cl.⁶ ..................................................... F01M 1/18
[52] U.S. Cl. ............................. 184/6.4; 184/7.4; 384/398
[58] Field of Search ......................... 184/6.4, 7.4, 108; 384/448, 397, 398, 399

[56] References Cited

U.S. PATENT DOCUMENTS

| | | | |
|---|---|---|---|
| 4,343,378 | 8/1982 | Bremer | 184/6.26 |
| 4,836,334 | 6/1989 | Vermeiren et al. | 384/448 |
| 5,060,760 | 10/1991 | Long et al. | 184/6.4 |
| 5,080,195 | 1/1992 | Mizumoto et al. | 184/6.4 |
| 5,484,212 | 1/1996 | Guaraldi et al. | 184/6.26 |

*Primary Examiner*—Thomas E. Denion
*Attorney, Agent, or Firm*—John Forrest; Jacob Shuster

[57] ABSTRACT

Precise quantities of lubricant from separate reservoirs under automatic control are injected into chambers of housings of shielded rolling element bearings. Separate feed line conduits directly deliver the lubricant to the shielded critical surfaces of such bearings and insure maintenance-free operation of machinery with which the bearings are associated.

10 Claims, 2 Drawing Sheets

SHIELDED BEARING LUBRICATION

The present invention relates in general to enhanced lubrication of bearings for maintenance-free operation of machinery with which such bearings are associated.

BACKGROUND OF THE INVENTION

Automatic lubrication systems are generally known in the art for controlled supply of lubricant to critical locations in machinery in an effort to provide maintenance-free operation thereof. U.S. Pat. No. 3,381,776 to Gruber et al., for example, discloses a time-actuated pneumatic injection system through which control and sensing of manifolds and pistons is designed to ensure that critical locations are properly lubricated. U.S. Pat. No. 4,621,931 to Jensen features regulation of flow of lubricant oil to hydrostatic bearings. As to the lubrication of a rolling element bearing under control of a condition sensing pneumatic system, U.S. Pat. No. 5,020,636 to Daeges discloses the introduction of lubricant into a propellant gas stream in accordance with a pressure gradient across the bearing. U.S. Pat. No. 5,217,662 to Yamsmuza et al. relates to the detection and measurement of motor loading parameters for timely supply of lubricating grease. Automatic time control for lubricating critical areas of machinery is also disclosed in U.S. Pat. No. 5,381,874 to Hadank et al. However, none of the foregoing U.S. patents addresses the problems of insuring mediate delivery of precise quantities of the lubricant to intended bearing locations while also ensuring that such delivery is made without ingress of contamination into the lubricant.

Accordingly, it is an important object of the present invention to provide for improved automatic delivery of precise quantities of clean lubricant to critical locations in a rolling element type of bearing.

SUMMARY OF THE INVENTION

In accordance with the present invention, automatic lubrication of rolling element bearings is enhanced by direct delivery of lubricant from reservoir sources through separate feed lines connected by fixed fittings to the bearing seals or shields. Critical surfaces of the rolling element bearing are thereby wetted with precise quantities of lubricant which is timely delivered without exposure to sources of contamination.

BRIEF DESCRIPTION OF THE DRAWING FIGURES

A more complete appreciation of the invention and many of its attendant advantages will be readily appreciated as the same becomes better understood by reference to the following detailed description when considered in connection with the accompanying drawing wherein:

FIG. 1 is a partial side elevation view of a pair of bearing assemblies in some machinery arrangement, in association with an automatic lubricating system depicted in a block diagram; and FIG. 2 is an enlarged side section view through one of the bearing assemblies shown in FIG. 1:

DETAILED DESCRIPTION OF PREFERRED EMBODIMENT

Figure 1:
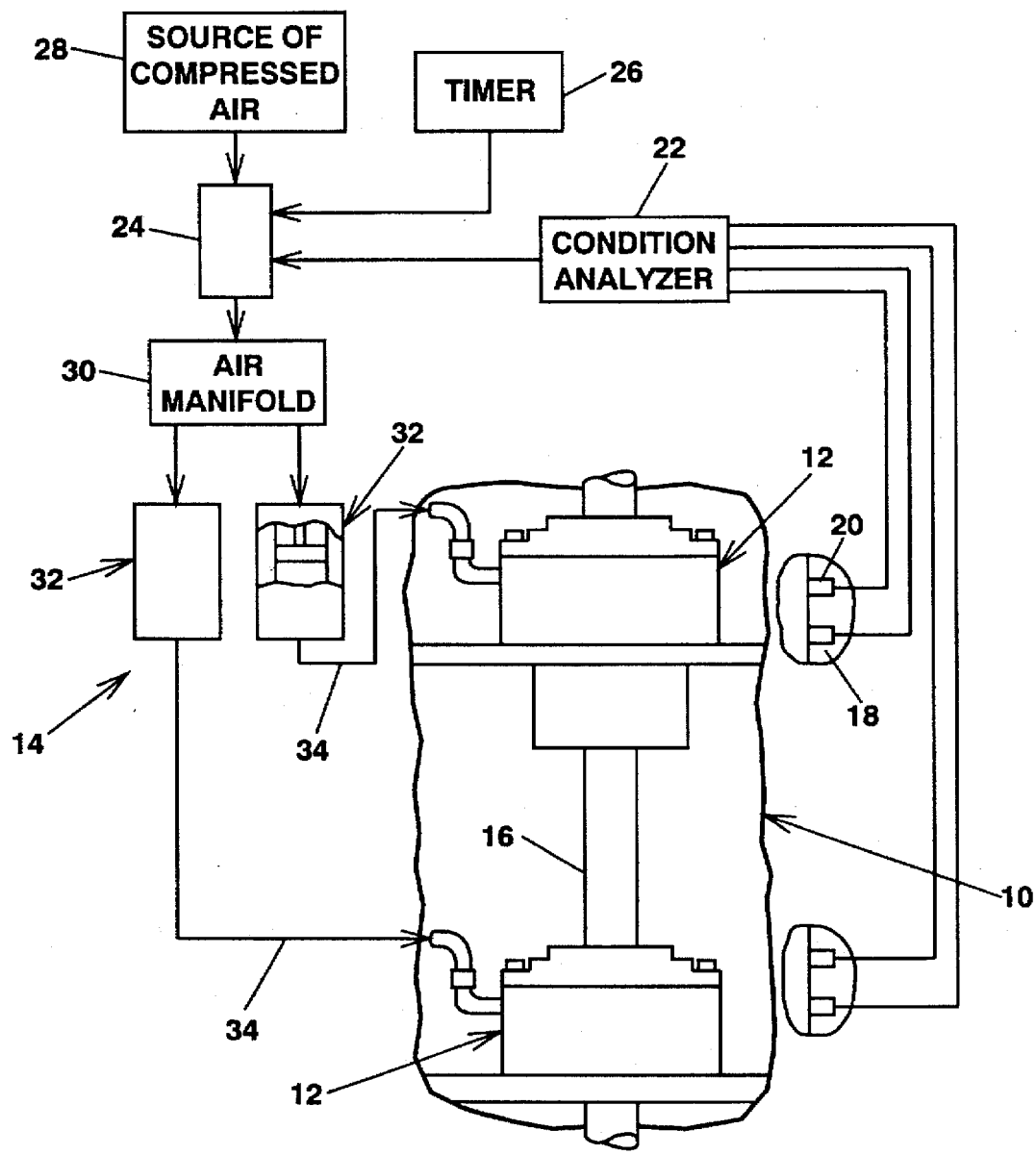

Referring now to the drawing in detail, FIG. 1 depicts a portion of typical machinery equipment, generally referred to by reference numeral 10, having bearing assemblies 12 serviced by a lubrication system generally referred to by reference numeral 14. As depicted in FIG. 1, at least two of the bearing assemblies 12 journal a power shaft 16 for rotation during operation of the machinery 10. Condition monitoring means for the machinery is associated with each of the bearing assemblies 12, including for example a temperature sensor 18 and a vibration sensor 20 according to the illustrated embodiment. Condition sensing signals from the sensors 18 and 20 at each bearing assembly 12 are fed to an analyzer 22 of the lubrication system 14 from which an output is fed to a pressure dispenser 24 in parallel with timing control signals from a timer 26. A source of compressed air 28 is connected to the dispenser 24 from which pressurized air is intermittently supplied on demand through an air manifold 30 to a pair of grease reservoirs 32 under control of analyzer 22 and/or timer 26.

It will be apparent from the foregoing description that grease as a lubricant is intermittently pressurized within each of the reservoirs 32 of the lubrication system 14 for supply to the bearing assemblies 12 in accordance with one or more condition factors designed to automatically provide time-controlled lubrication for maintenance-free operation of the machinery 10. In accordance with the present invention, such maintenance-free operation is maximized by supply of the grease under pressure from the respective reservoirs 32 separately to the bearing assemblies 12 through single feed line conduits 34, in cooperation with contamination prevention; features of the bearing assemblies as hereinafter disclosed.

Figure 2:
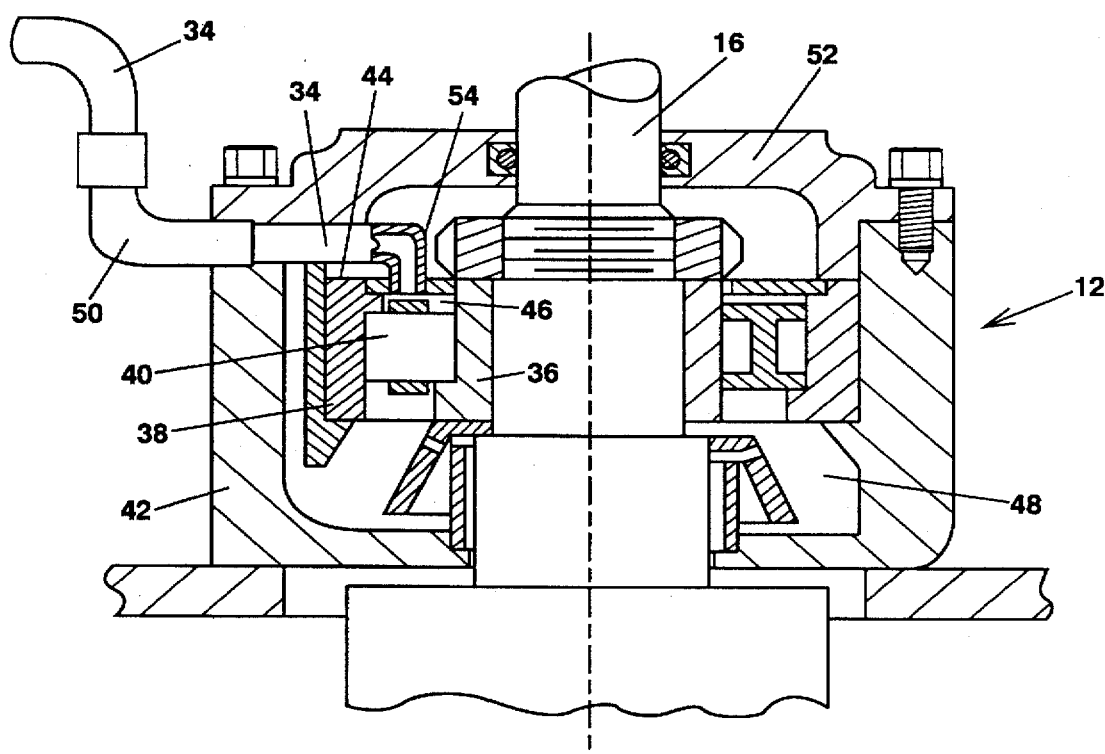

Referring now to FIG. 2, each of the bearing assemblies 12 to which a feed line conduit 34 is connected, has an inner ring 36 fixed to the power shaft 16, an outer ring 38 and circumferentially spaced rolling elements 40 in rolling contact with the radially confronting raceway surfaces of the inner and outer rings. The outer ring 38 of such rolling element type bearing is fixedly mounted by a housing 42. An annular shield 44 is fixed to the outer ring 38 in spaced relation to the rolling elements 40 to enclose a lubricant receiving space 46 on one axial side of the rolling elements opposite the space 48 on the other axial side within which excessive and degraded lubricating grease is accumulated. The grease under pressure is supplied to the receiving space 46 from one of the feed line conduits 34 through a fitting 50 extending into the housing 42 closed by a cover 52. A delivery end portion 54 of each feed line conduit 34 within the housing 42 is threadedly connected to the shield 44 for supply of a requisite quantity of lubricant to space 46 as shown in FIG. 2.

Precise quantities of lubricant grease are automatically fed under pressure at proper times by the lubrication system 14 directly to each bearing assembly 12 through the separate feed line conduits 34 to insure timely delivery. The grease is so delivered to each receiving space 46 within the chamber of each bearing assembly so as to insure that there is no ingress of contamination during lubricant delivery. The chamber of each bearing assembly also has the accumulating space 48 to receive excess and degraded lubricant grease from the rolling element bearing surfaces being lubricated so as to insure maintenance-free operation of the machinery 10 being serviced.

Obviously, other modifications and variations of the present invention may be possible in light of the foregoing teachings. It is therefore to be understood that within the scope of the appended claims the invention may be practiced otherwise than as specifically described.

What is claimed is:

1. In combination with an assembly of rolling element bearings which require wetting of critical surfaces therein with lubricant for maintenance-free operation, and time-controlled feed means for automatically supplying said lubricant from separate reservoirs to the bearings in accordance with varying environmental conditions; apparatus for insuring said maintenance-free operation comprising: shield means protectively enclosing each of said bearings for confinement within chambers respectively divided by said critical surfaces into receiving and accumulating spaces; and lubricant conduit means connecting said reservoirs of the time-controlled feed means separately to the respective bearings through the shield means associated therewith for intermittently delivering precise quantities of the lubricant to the receiving spaces of the chambers having the accumulating spaces into which excessive and degraded lubricant is discharged from the bearings.

2. The combination as defined in claim 1 wherein said lubricant is grease supplied under pressure by the time-controlled feed means for flow from said separate reservoirs through the conduit means directly into the receiving spaces.

3. The combination as defined in claim 2 wherein said varying environmental conditions include temperature and vibration.

4. The apparatus as defined in claim 3 wherein said conduit means comprises a plurality of separate feed lines respectively connecting the separate reservoirs to the shield means respectively enclosing the bearings.

5. The combination as defined in claim 1 wherein said varying environmental conditions include temperature and vibration.

6. The apparatus as defined in claim 1 wherein said conduit means comprises a plurality of separate feed lines respectively connecting the separate reservoirs to the shield means respectively enclosing the bearings.

7. In combination with an assembly of bearings, each bearing having a chamber enclosing critical surfaces which require wetting with lubricant intermittently supplied for maintenance-free operation; apparatus for enhancing lubrication of the bearings to insure said maintenance-free operation comprising: separate pressurized sources of said lubricant; shield means for protectively enclosing said chambers in each of the bearings, and conduit means respectively connecting said pressurized sources of the lubricant to the shield means for separate delivery of precise quantities of the lubricant to the respective bearings while preventing ingress of contamination.

8. The apparatus as defined in claim 7 wherein said critical surfaces are formed on rolling elements and raceways of the bearings dividing each of the chambers into a receiving space to which the lubricant is directly supplied by said separate delivery and an accumulating space into which excessive and degraded lubricant is discharged.

9. The combination as defined in claim 8 wherein said lubricant is grease.

10. The combination as defined in claim 7 wherein said lubricant is grease.

* * * * *